Jan. 31, 1950

D. M. LIGHT 2,496,250

BRAKE HEAD ARRANGEMENT

Filed Nov. 14, 1945

INVENTOR.
David M. Light
BY
Ann O. B. Garner
Atty.

Jan. 31, 1950   D. M. LIGHT   2,496,250
BRAKE HEAD ARRANGEMENT
Filed Nov. 14, 1945   3 Sheets-Sheet 2
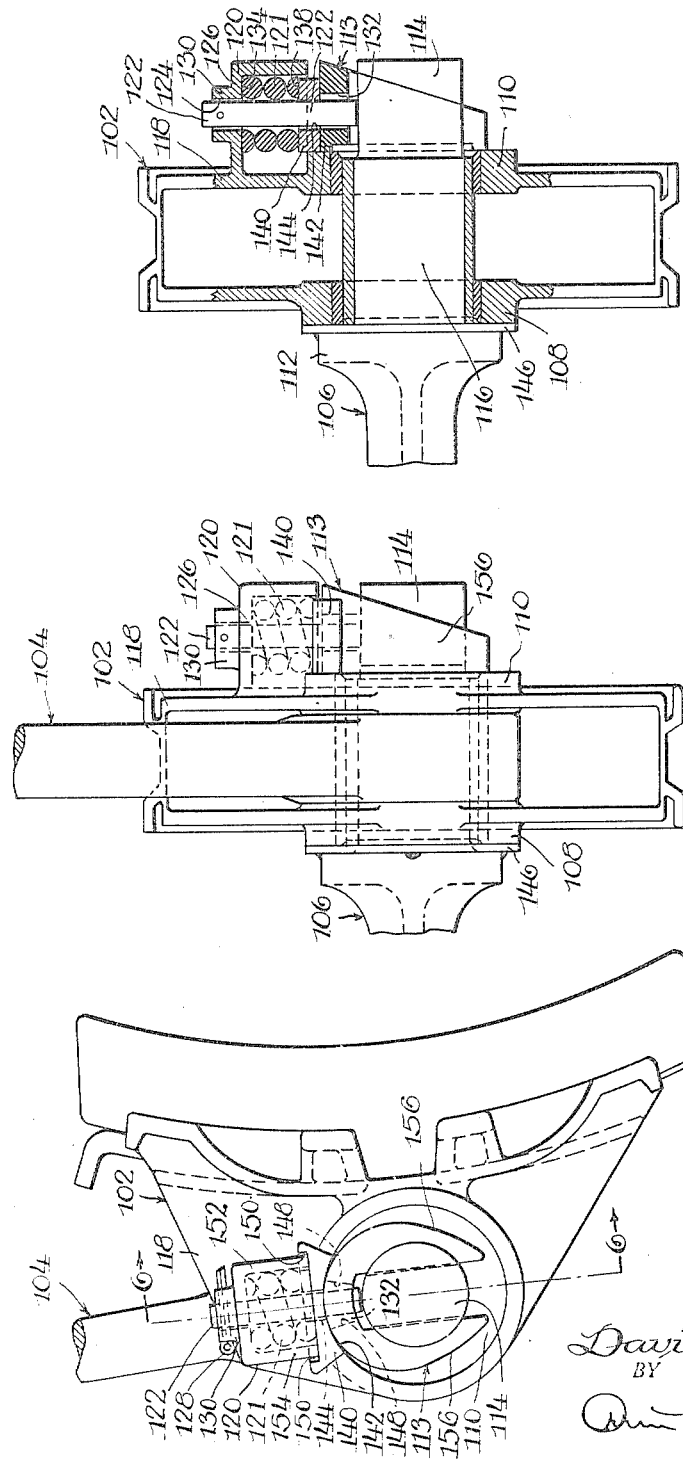
INVENTOR.
David M. Light
BY
Atty.

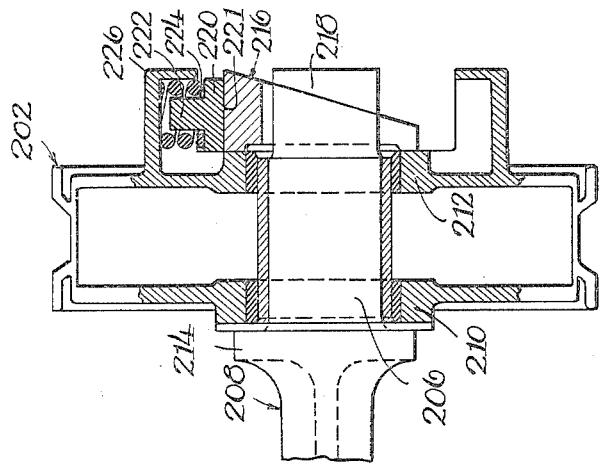
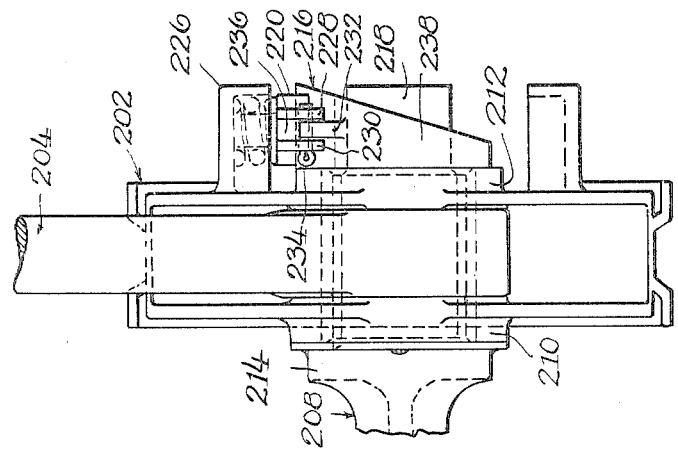
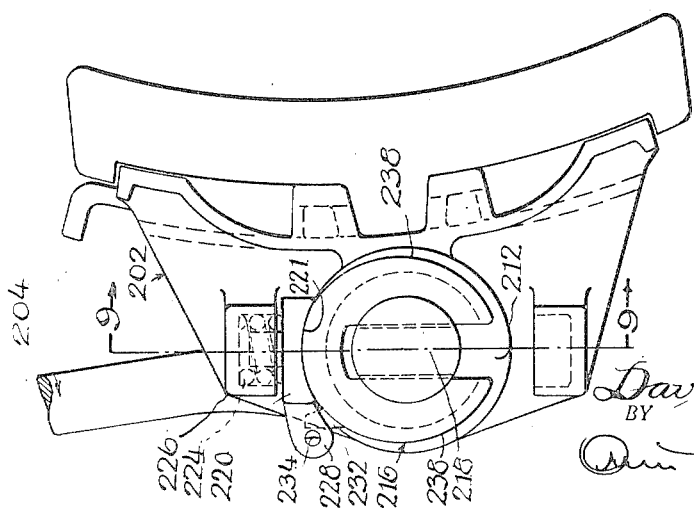

Patented Jan. 31, 1950

2,496,250

UNITED STATES PATENT OFFICE 2,496,250

BRAKEHEAD ARRANGEMENT

David M. Light, Chicago, Ill., assignor to American Steel Foundries, Chicago, Ill., a corporation of New Jersey Application November 14, 1945, Serial No. 628,543

18 Claims. (Cl. 188—207)

My invention relates to railway brake equipment and more particularly to mechanism for yieldably maintaining a brake head in a desired position relative to its supporting member, said mechanism being commonly known as a brake head balancing device.

An object of my invention is to provide a brake head balancing device for controlling pivotal movement of a brake head on its supporting member within limits insuring proper application of a brake shoe associated with the head to the breaking surface of a wheel or other member to be braked.

Another object of my invention is to devise a brake head balancing device comprising novel wedge means for maintaining the brake head in assembled relationship with a brake beam and for frictionally resisting pivotal movement of the brake head on the beam and limiting such movement to a degree insuring the head being held in an operative position with respect to an associated wheel.

A further object of my invention is to devise a novel device of the type described wherein the brake head is pivotally mounted on the trunnion of an associated brake beam, which comprises a shoulder frictionally engaging the head, and the device includes novel wedge means having a spring operatively urging the same into frictional engagement with the head, and also into locking engagement with the trunnion for maintaining the device in assembled relationship. In modifications of the invention, the wedge means functions as described and in addition, the spring has friction means associated therewith operatively urged thereby into frictional engagement with the wedge means.

A specific object of my invention is to provide in an arrangement as above described, a retaining member having a novel wedge connection to the beam, a spring being compressed against the retaining member for urging the latter into frictional engagement with the brake head and thereby the brake head against a shoulder on the beam, thereby affording the desired friction.

Another object of my invention is to provide novel means on the before-mentioned retaining member cooperating with means associated with the brake head for limiting relative pivotal movement of the brake head and member in the event that the spring should become broken in service.

Other various and novel features of the invention will be apparent from the following description and drawings and will be particularly pointed out in the appended claims.

In the drawings:

Figure 4 is a side elevation of a modification of the brake head balancing device illustrated in Figures 1–3 inclusive;

Figure 5 is a rear view of the structure shown in Figure 4;

Figure 6 is a sectional view taken through the modification of Figure 4 substantially in the plane indicated by the line 6—6 thereof, the hanger being omitted;

Figure 7 is a side elevation of another modification of the device illustrated in Figures 1–3 inclusive;

Figure 8 is a rear view of the structure shown in Figure 7; and

Figure 9 is a sectional view taken through the modification of Figure 7 substantially in the plane indicated by the line 9—9 thereof with the hanger removed.

Figure 3:
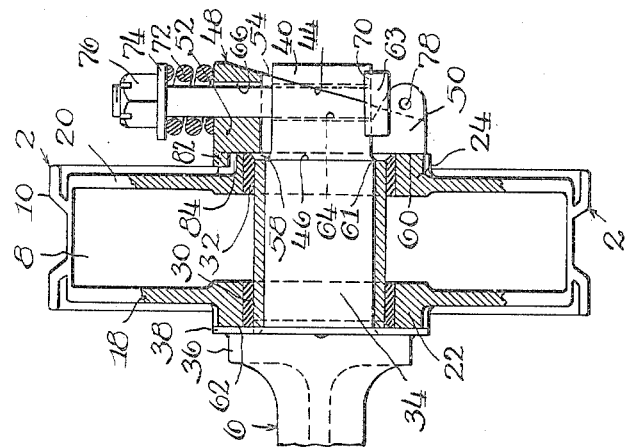
Figure 3 is a sectional view thereof taken approximately in the plane of the hanger and as indicated by the line 3—3 of Figure 1, the hanger being omitted in this view.
Figure 2:
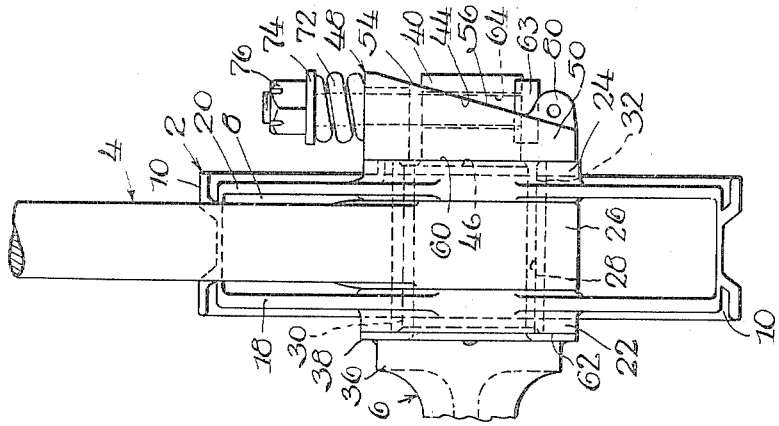
Figure 2 is a rear view of the structure shown in Figure 1.
Figure 1:
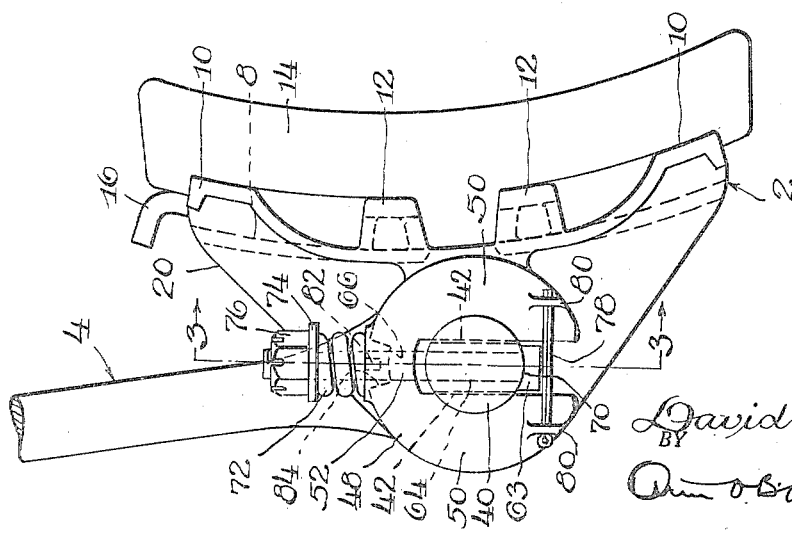
Figure 1 is a side elevation of my novel device, only a fragmentary portion of the supporting hanger and brake beam being shown.

Describing the structure in detail and referring first to Figures 1–3, inclusive, the invention is illustrated as applied to a well known type of brake rigging in which a brake head generally designated 2 is pivotally connected to a hanger generally designated 4 by means of a brake beam 6, said beam being adapted in conventional manner for connection to associated actuating means (not shown), such as a brake lever, by which the beam and head are urged into braking cooperation with an associated rotatable member such as the wheel of a railway car truck.

The brake head 2 comprises a front wall 8 formed with spaced end lugs 10, 10 and spaced intermediate lugs 12, 12 to which a brake shoe 14 is connected in conventional manner, as seen in Figure 1, by a key 16. The brake head comprises spaced inboard and outboard walls 18 and 20 providing spaced bearing portions 22 and 24 respectively, receiving therebetween a bearing portion 26 at the lower end of the hanger 4 which is provided with a bushed opening 28 (Figure 2) in alignment with bushed openings 30 and 32 in the bearing portions 22 and 24 of the walls 18 and 20 respectively of the brake head.

The brake beam 6 includes a bushed trunnion end 34 extending through the openings 28, 30 and 32 to afford pivotal connection between the head and the hanger, said trunnion end 34 terminating in a shoulder 36 on the beam to which a wear plate 38 may be secured in any desired manner, as for example, by welding, said plate being adapted for frictional engagement as hereinafter described, with the bearing portion 22 of the inboard brake head wall 18. It will be understood by those skilled in the art that if desired the plate 38 may be eliminated and the brake head may bear directly against the shoulder 36 of the beam so that the plate 38 may, for functional purposes, be regarded as a part of the beam itself.

Adjacent its outboard end, the beam is machined to form a portion 40 of reduced diameter having spaced parallel slots 42, 42 formed in opposite sides thereof, said slots being defined at their outboard ends by diagonal surfaces 44, 44 sloping downwardly toward the brake head 2 and being defined at their inboard ends by vertical surfaces 46, 46, said slots 42, 42 serving a purpose hereinafter described.

The brake assembly described above is maintained in assembled relationship by means of a wedge member 48 of inverted U shape and comprising spaced legs 50, 50 depending from a central connecting portion 52, said legs 50, 50 being received within the slots 42, 42 and having outboard diagonal surfaces 54, 54 disposed in coplanar relationship for complementary engagement as at 56, 56 with the surfaces 44, 44 on the trunnion portion 40, the inboard side of said member 48 being formed with a vertical surface 58 in complementary engagement as at 60 with the bearing portion 24 of the brake head inboard wall 20 which may project beyond the surfaces 46, 46 of the slots 42, 42 and the shoulder 61 of the trunnion defining the inboard end of the reduced end portion 40 thereof.

It may be noted from a consideration of Figures 2 and 3 that upon insertion of the legs 50, 50 of the wedge member 48 within the slots 42, 42 in the trunnion portion 40, due to the inclination of the surfaces 54, 54 of the legs 50, 50 of said member and the surfaces 44, 44 of the portion 40, the wedge member 48 will engage the bearing portion 24 of the brake head and urge the brake head bearing portion 22 into frictional engagement as at 62 with the plate 38 secured to the shoulder 36 of the brake beam. Also, as the wedge member 48 is fixed on the beam and will rotate with the same relative to the brake head, the engagement of the member with the brake head as at 60 will also cause frictional resistance to the rotation of the brake head on the beam.

To secure the above-described desirable frictional resistance to the rotation of the brake head on the beam, a bolt 63 extends through an opening 64 in the trunnion portion 40 between the spaced slots 42, 42 in opposite sides thereof and also through an opening 66 in the central portion 52 of the wedge member 48, the head of said bolt having abutment as at 70 with the bottom of said portion 40, and the threaded end of said bolt having a spring 72 sleeved thereover and compressed between said wedge member and a washer 74 by means of a nut 76, said spring serving to urge the wedge member 48 into wedge engagement with the trunnion portion 40 and thereby, through the engagement of the member 48 as at 60 with the brake head, the latter will be urged into frictional engagement with the plate 38 on the shoulder 36 of the beam. In the event the nut 76 should become accidentally disengaged from the bolt 63, a cotter 78 extending through aligned openings in the lugs 80, 80 on the legs 50, 50 of the member 48 will abut the head of the bolt and thereby prevent disassembly of the bolt from the trunnion end of the beam.

It may be noted that the upper edge of the inboard side of the wedge member 48 is provided with a lug 82 received within a slot 84 in the adjacent side of the bearing portion 24 of the brake head, the opposed marginal edges of said slot being spaced from the lug 82 to permit the beforementioned pivotal or rotational movement of the brake head 2 relative to the beam 6 and defining limits permitting the brake head to adjust itself to the periphery of an associated wheel. Also, in the event the spring 72 should become broken, as sometimes occurs under the severe conditions to which a device of this type is subjected, the pivotal movement of the head will be limited by abutment of the lug 82 with one of the margins of the slot 84, thus preventing the extreme rotation of the head to a point at which it might be knocked off the beam, thereby creating the danger of derailment.

In the assembly of the device, the brake head 2 and hanger 4 are connected to th trunnion 34 of the beam 6 and the wedge member 48 may have its legs 50, 50 inserted within the spaced slots 42, 42 of the trunnion portion 40. The bolt 63 is then inserted within the aligned openings 64 and 66 of the trunnion portion 40 and the member 48 respectively, and the spring 72 may then be sleeved over the upper threaded end of the bolt, whereupon the washer 74 and nut 76 may be connected to the latter to compress the spring 72. The cotter 78 is then inserted within the openings in the lugs 80, 80 of the member 48 to complete the assembly of the device.

The modification of the invention illustrated in Figures 4-6 inclusive comprises a brake head 102 and hanger 104 pivotally mounted on the brake beam 106, the brake head 102 having the inboard and outboard bearing portions 108 and 110 in frictional engagement respectively with the shoulder 112 on the beam 106 and the wedge member 113 in wedge engagement with the reduced portion 114 of the trunnion 116 of the beam as described in the previous embodiment of the invention. In the modification, the outboard wall 118 of the brake head is formed with a spring pocket 120 receiving therewithin a spring 121 sleeved over a pin 122 having one end thereof extending through an opening 124 in the top wall 126 of said pocket and fixed to said wall by a cotter 128 extending through aligned openings in said pin and an annular lug 130 on said wall, the other end of said pin being received within an opening 132 in the wedge member 113 and being disposed adjacent the perimeter of the reduced end portion 114 of the beam trunnion 116. The spring 121 has its upper end bearing as at 134 against the top wall 126 of the spring pocket 120 and its lower end reacting as at 138 against a friction block 140, said block having an arcuate surface in complementary engagement as at 142 with the perimeter of the wedge member 113, an opening 144 in said block receiving the pin 122 for permitting movement of said block longitudinally of the pin. It will be apparent from the foregoing description that the spring 121, under compression between the block 140 and the top wall 126 of the spring pocket 120, will urge the block into frictional engagement with the wedge member 113 and thereby the latter into wedge engagement with the trunnion portion 114 for effecting frictional engagement of the member 113 with the brake head bearing portion 110 and also frictional engagement of the bearing portion 108 of the brake head with the friction plate 146 fixed to the shoulder 112 of the beam.

To limit pivotal movement of the brake head on the trunnion of the beam, the lower end of the pin 122 is engageable with one of the stops 148, 148 afforded by the angularly arranged faces defining the marginal edges of the opening 132 in the wedge member 113. To prevent external forces applied to the brake head from causing lateral relative displacement of the opposite ends of the pin 122, impairing its limiting function and which may also place bending stresses thereon, the pin 122 is closely fitted within the opening 144 of the block 140 and the block is formed with parallel slots 150, 150 receiving the adjacent ends of the oppositely disposed walls 152 and 154 of the spring pocket 120.

In the assembly of the device, the brake head 102 and hanger 104 are connected to the beam 106 and the spring 121 and friction block 140 are positioned within the spring pocket 120 of the brake head. The brake head is then positioned with the friction shoe in a horizontal position to permit the insertion of the spaced legs of the wedge member 113 within the slots of the trunnion portion 114 and engagement of the outer perimeter thereof with the friction block 140. In order to obtain the desired spring pressure by compression of the spring 121, the legs are formed to provide cam faces 156, 156, one of which may be engaged with the arcuate surface of the friction block 140 in the aforesaid position of the brake head so that upon rotation of the brake head to the position shown in Figure 4, the block 140 will be urged inwardly of the spring pocket 120 of the brake head with resultant compression of the spring 121. To complete the assembly of the device, the pin 122 may then be inserted within the aligned openings 124, 144 and 132 and the upper end thereof may be connected to the annular lug 130 of the spring pocket wall 126.

The modification illustrated in Figures 7-9 inclusive comprises the brake head 202 and hanger 204 pivotally connected to trunnion 206 of the beam 208, the bearing portions 210 and 212 of the brake head having frictional engagement respectively with the shoulder 214 of the brake beam and the wedge member 216 in wedge engagement with the reduced end portion 218 of the beam trunnion 206, the structure differing from that of the previous modification in that a friction block 220 in frictional engagement as at 221 with the outer perimeter of the wedge member is provided with a spring-positioning lug 222 extending upwardly within the spring 224 compressed between the same and the top wall of the spring pocket 226, the friction block 220 having spaced parallel lugs 228 and 230 extending outwardly at one side thereof receiving therebetween an upwardly projecting lug 232 on the wedge member and having a cotter 234 extending through aligned openings therein, said cotter and the side 236 of the wedge block being engageable with the lug 232 on the wedge member to limit rotation of the brake head on the brake beam.

The device may be assembled by positioning the brake head and brake hanger on the brake beam, the friction block and spring then being assembled within the spring pocket on the brake head and the brake head being held in a horizontal position. Thereafter the wedge member may have its spaced legs inserted within the parallel slots in the trunnion portion 40 and the brake head and shoe may be rotated to the position shown in Figure 7 for effecting the desired compression of the spring by the camming action of the cam faces 238, 238 on the wedge block. The cotter may then be passed through the aligned openings in the lugs on the wedge member to complete the assembly of the device.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a brake head balancing device, a brake beam having a trunnion terminating at its inboard end in a shoulder, a brake head pivotally mounted on said trunnion, spaced parallel transverse slots in said trunnion at the outboard end thereof, coplanar diagonal surfaces on said trunnion in said slots sloping toward said head, a wedge member having spaced legs within said slots in complementary engagement with said surfaces, a bolt extending through an opening in said trunnion between said slots and an opening in said member, abutment means on said bolt, resilient means sleeved over said bolt and compressed between said abutment means and said member for operatively urging the latter along said surfaces into frictional engagement with said head and said head into frictional engagement with said shoulder, and interengaging stop means on said member and said head for limiting rotation of said head on said trunnion.

2. In a brake head balancing device, a brake beam having a trunnion terminating at its inboard end in a shoulder, a brake head pivotally mounted on said trunnion and in frictional engagement with said shoulder, spaced parallel transverse slots in said trunnion at the outboard end thereof, coplanar diagonal surfaces on said trunnion in said slots, a wedge member in frictional engagement with said head and having spaced legs in complementary engagement with said surfaces, a spring pocket projecting laterally from said head adjacent said surface, a friction element in arcuate face engagement with said wedge member, resilient means housed in said pocket and reacting against said element, and a pin extending through aligned openings in said pocket, element, and spring and within an opening in said member having opposite marginal edges thereof spaced from said pin and engageable therewith for limiting relative rotation of said head and said beam.

3. In a brake head balancing device, a brake beam having a trunnion terminating at its inboard end in a shoulder, a brake head pivotally mounted on said trunnion and in frictional engagement with said shoulder, spaced parallel transverse slots in said trunnion at the outboard end thereof, wedge surfaces on said trunnion in said slots, a wedge member in frictional engagement with said head and having spaced legs in complementary engagement with said surfaces, an arcuate friction surface on said member, a spring pocket projecting laterally from said head adjacent said surface, a friction element in complementary engagement with said arcuate surface, resilient means housed in said pocket and reacting against said element, and means carried by said pocket and extending within said member for engagement therewith to limit relative rotation of said head and beam.

4. In a brake head balancing device, a brake beam having a trunnion terminating at its inboard end in a shoulder, a brake head pivotally mounted on said trunnion and in frictional engagement with said shoulder, a transverse slot in said trunnion at the outboard end thereof, a diagonal surface on said trunnion in said slot, a wedge member in frictional engagement with said head and in complementary engagement with said surface, a spring seat extending laterally from said head adjacent said member, a friction element in frictional engagement with said member, a spring compressed between said seat and said element, and means fixed to said seat and extending through said spring and said element into said member and engageable with the latter for limiting relative rotation of said head and beam.

5. In a brake head balancing device, a brake head, a pivot member pivotally mounting said head and having a shoulder in frictional engagement with one side of said head, spaced parallel slots in said member adjacent the opposite side of said head, coplanar wedge surfaces on said member within said slots, a wedge member in frictional engagement with said head and comprising spaced legs in complementary engagement with said surfaces, a spring pocket on said head adjacent said wedge member, a friction element in frictional engagement with said wedge member and having spaced slots therein receiving oppositely disposed walls of said pocket, a spring in said pocket and bearing against said element, and interengaging means on said wedge member and said element limiting relative rotation of said pivot member and said brake head member.

6. In a brake head balancing device, a brake beam having a trunnion terminating at its inboard end in a shoulder, a brake head pivotally mounted on said trunnion, wedge means on said trunnion at the outboard end thereof, a wedge member having diagonal face engagement with said wedge means, an elongate member having engagement at one end thereof with said trunnion and extending through the same and said member, resilient means compressed between abutment means on said elongate member at the opposite end thereof and said wedge member for operatively urging said wedge member and said wedge means into engagement and thereby said wedge member into frictional engagement with said head and said head into frictional engagement with said shoulder, and interengaging stop means on said head and said member for limiting relative rotation of said head and beam.

7. In a brake head balancing device, a pivot member having abutment means at one end thereof, a brake head pivotally mounted on said member and having one side thereof in frictional engagement with said abutment means, wedge means on said member adjacent the opposite side of said head, a wedge element cooperating with said wedge means and urged thereby into frictional engagement with said head, said element being rotatable with said means for movement relative to said head, an elongate member extending transversely through said element and having abutment means at opposite ends thereof, and resilient means sleeved over said elongate member and between said last-mentioned abutment means and compressed between one of said abutment means and said element for urging said element into said engagement with said head and said wedge means.

8. In a balancing and retaining device for a brake head member having an opening receiving a pivot member, and having frictional engagement with the pivot member along surfaces angularly related to the pivotal axis of said members; the combination of retainer means comprising an element in wedge engagement with said pivot member outboardly of said head member, a spring compressed against said retainer means for urging said element along said pivot member against said head member and thereby the latter to a position engaging said surfaces on said members, and means for transmitting the reaction of said spring to one of said members.

9. In a brake head balancing and retaining device, a brake head, a pivot member extending therethrough and having a shoulder engaging one side thereof, a wedge engaging the other side of the head and in wedge engagement with said member, and friction means carried by the head engaging said wedge and adapted to urge the same along said member against said head and the latter against said shoulder.

10. In a brake head balancing device, a brake beam having a trunnion terminating at its inboard end in a shoulder, a brake head pivotally mounted on said trunnion, spaced parallel transverse slots in said trunnion at the outboard end thereof, coplanar diagonal surfaces on said trunnion in said slots sloping toward said head, a wedge member having spaced legs within said slots in complementary engagement with said surfaces, a bolt extending through a transverse opening in said trunnion between said slots and an opening in said member, abutment means on said bolt, and resilient means sleeved over said bolt and compressed between said abutment means and said member for operatively urging the latter along said surfaces into frictional engagement with said head and said head into frictional engagement with said shoulder.

11. In a brake head balancing and retaining device, a brake head, a pivot member extending through said head and having a surface engaging one side thereof, spaced slots in opposite sides of said member adjacent the other side of said head, wedge faces on said member within said slots sloping toward the head, a wedge retainer having spaced legs within said slots in complementary engagement with said faces and said head, a friction element in engagement with said retainer, resilient means compressed between abutment means on said head and said element for urging said element against said retainer and the latter along said faces against said head and thereby said head into frictional engagement with said surface, said retainer being fixed against rotation with respect to said member and said element being rotatable with said head, and interengaging stop means on said element and retainer for limiting relative rotation between said head and said member.

12. In a brake head balancing device, a brake head having spaced walls, a pivot member extending through said walls and having a shoulder at one end thereof in frictional engagement with one wall of said head, a slot in said member at the other end thereof, a wedge surface on said member within said slot sloping toward said head, a wedge member in frictional engagement with the other wall of said head and extending within said slot in complementary engagement with said surface, abutment means on said last-mentioned wall extending laterally therefrom, a friction element in frictional engagement with said wedge member, and resilient means compressed between said abutment means and said element.

13. In a brake head balancing device, a brake beam having a trunnion terminating at its inboard end in a shoulder, a brake head pivotally mounted on said trunnion, wedge means on said trunnion at the outboard end thereof, a wedge member having diagonal face engagement with said wedge means, an elongate element having engagement at one end thereof with said trunnion and extending through the same and said member, and resilient means compressed between said wedge member and abutment means on said element at the opposite end thereof for operatively urging said wedge member and said wedge means into engagement and thereby said wedge member into frictional engagement with said head and said head into frictional engagement with said shoulder.

14. In a brake head balancing and retaining device, a brake head member, a pivot member extending therethrough and carrying means at opposite sides of said head member in engagement therewith for resisting rotation thereof and securing the same on said pivot member, one of said means comprising transverse diagonal surfaces on the pivot member facing said head member, a wedge element interposed between and engaging said head member and surfaces, abutment means associated with one of said members, and resilient means reacting between said element and said abutment means for urging said element along said surfaces against said head member and thereby the latter against the other of said first-mentioned means, said first-mentioned means being secured against rotation with respect to said pivot member.

15. In a brake head balancing and retaining device, a brake beam member having a trunnion terminating at its inboard end in a shoulder, a brake head member pivoted on the trunnion, wedge means on the trunnion at the outboard end thereof, retainer means comprising a wedge interposed between said member and said wedge means and having diagonal face engagement with the latter, abutment means on one of said members, and resilient means compressed between said retainer means and said abutment means for moving the wedge along said wedge means against said head member and thereby the latter against said shoulder, said wedge and trunnion being interlocked against relative rotation.

16. In a brake head balancing and retaining device, a nonrotatable pivot member having a fixed abutment adjacent one end and fixed wedge means adjacent its opposite end, a brake head member pivoted on said pivot member intermediate the ends thereof, retainer means interposed between and engaging said head member and said wedge means, abutment means connected to one of said members, a spring between said abutment means and retainer means reacting thereagainst and urging said retainer means along said wedge means against said head member and thereby the latter into frictional engagement with said fixed abutment, said retainer means being held against movement directly axially of said pivot member away from said head member through engagement with said wedge means and cooperating with said fixed abutment for holding said head member on said pivot member.

17. In a brake head balancing and retaining device, a brake head having an opening receiving a pivot member, and having frictional engagement with the pivot member along surfaces angularly related to the pivotal axis of said head; the combination of wedge means on said member spaced from said head, a retainer interposed between and engaging said wedge means and said head, a friction element in engagement with said retainer along surfaces concentric with said axis, a pocket on said head, and spring means in said pocket reacting against said element for urging said element against said retainer and the latter along said wedge means against said head.

18. In a brake head mounting, an assembly comprising a brake head member and a hanger, a pivot member extending through said member and hanger and affording a pivotal connection therebetween, a friction surface on said pivot member in frictional engagement with one side of said assembly, laterally extending surfaces on said pivot member spaced from and facing the opposite side of said assembly and sloping toward the same, a wedge element interposed between said surfaces and said opposite side of said assembly and in frictional engagement therewith, abutment means on one of said members, and spring means compressed between said abutment means and said element for urging said element along said surfaces and into said engagement with said assembly, thereby urging the latter into frictional engagement with said friction surface.

DAVID M. LIGHT.

REFERENCES CITED

The following references are of record in the file of this patent:

UNITED STATES PATENTS

| Number | Name | Date |
| --- | --- | --- |
| 533,559 | Robischung | Feb. 5, 1895 |
| 957,400 | Williams | May 10, 1910 |
| 1,165,660 | Floyd | Dec. 28, 1915 |
| 1,421,881 | Williams et al. | July 4, 1922 |
| 1,604,351 | Hedgcock | Oct. 26, 1926 |
| 2,010,531 | Baselt | Aug. 6, 1935 |
| 2,158,535 | Davidson | May 16, 1939 |